Figure 1:
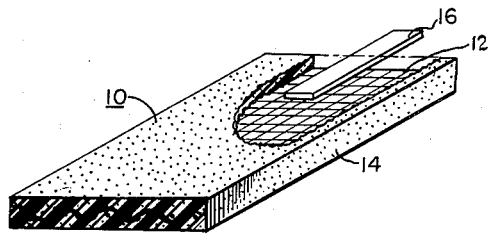

March 6, 1962     E. I. ADLER     3,024,296
PROCESS FOR MAKING BATTERY ELECTRODES
Filed May 17, 1960

INVENTOR.
Edward I. Adler
BY
*Leonard H. King*

3,024,296
PROCESS FOR MAKING BATTERY ELECTRODES
Edward I. Adler, Englewood, N.J., assignor to
Myron A. Coler, Scarsdale, N.Y.
Filed May 17, 1960, Ser. No. 29,603
10 Claims. (Cl. 136—24)

This invention relates to an improved process for making battery electrodes, and in particular, to an improved process for making conductive plastic electrodes of the type suitable for use in nickel-cadmium alkaline cells, and the like.

Briefly stated, the process of this invention is carried out by initially forming particles of a conductive plastic composition. The particles are then molded to form a porous plaque structure. To form a positive electrode the resulting porous plaque is then impregnated with a modified nickel nitrate solution. The nickel nitrate is, in turn, converted to nickel hydroxide in an electrolytic bath containing sodium hydroxide, the plaque serving as a cathode. The loading process is repeated until an adequate deposit of nickel hydroxide has been deposited. The plaque is then connected, as an anode, in an electrolyte bath and the electrode is formed, that is, the nickel hydroxide is converted to nickel oxide. In like fashion the porous plaque may be impregnated with cadmium nitrate which is subsequently electrolytically converted to cadmium oxide to form a negative electrode.

One unexpected problem was found to be the difficulty in impregnating the conductive plastic plaque, as normal impregnating solutions regularly employed for conventional sintered nickel electrode plaques proved inoperative. This obstacle was overcome by employing the claimed improved impregnating solutions which contain wetting agents.

It is an object of this invention to provide an improved method of making positive electrodes for alkaline cells.

It is a particular object of this invention to provide an improved nickel nitrate impregnating solution for porous conductive plastic electrode plaques.

Another object of the invention is to provide an improved cadmium salt impregnating solution.

A further object is to provide a method of making conductive plastic negative electrodes of the cadmium type.

Still other objects and advantages of this invention will be pointed out with particularity, or will become obvious as the following description proceeds.

Figure 2:
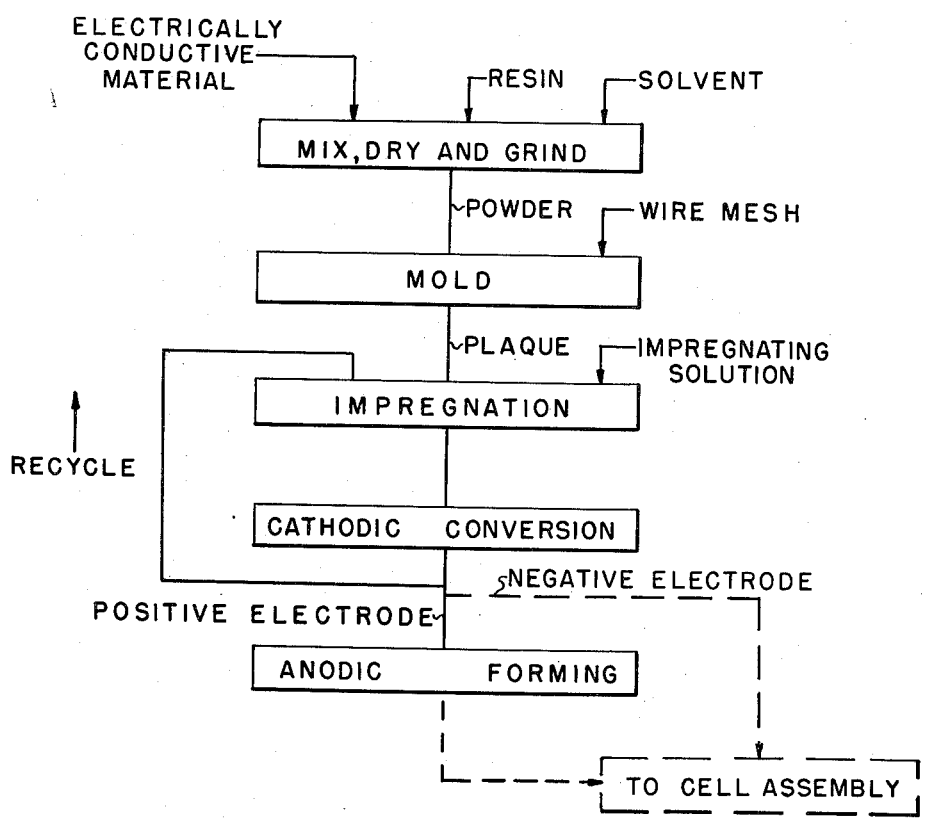

In the drawing:

FIGURE 1 is a pictorial representation of an electrode with a portion broken away to expose a metal mesh structural reinforcing and electron conducting member, and FIGURE 2 is a flow sheet of the process for producing the electrode of FIGURE 1.

The following examples will serve to further illustrate the preparation of the electrodes of FIGURE 1 by the process of FIGURE 2.

*Preparation of Conductive Plastic—Type A*

By means of a high speed propeller mixer, 190 grams of carbonyl nickel powder was combined with 50 grams of a solution comprising 10 grams of a copolymer and 40 grams methyl ethyl ketone. The copolymer was composed of 85 parts by weight of polyvinyl chloride and 15 parts by weight of polyvinyl acetate. After the carbonyl nickel particles were thoroughly wet, mixing was discontinued and the mass oven-dried for 16 hours at 60° C. to form a dry cake.

*Preparation of Conductive Plastic—Type B*

By means of a high speed propeller mixer, 60 grams of conductive furnace black was dispersed in 50 grams of a 20% by weight methyl ethyl ketone solution of the 85:15 polyvinyl chloride-polyvinyl acetate copolymer. After the acetylene black was thoroughly dispersed the resulting paste was oven-dried at 60° C. for 16 hours to form a dry cake.

In each instance the resulting cake was micropulverized in a high speed Metal Disintegrating Company Bantam Micropulverizer to yield finely divided conductive plastic powder having a particle size in the range of 70 to 100 mesh (Tyler Standard).

*Fabrication of the Porous Plaques*

In order to make a porous conductive plastic plaque, particles of conductive plastic or aggregates were molded at temperatures sufficient to obtain particle-to-particle bonding without excessive squashing and elimination of voids. A temperature of 350° F. and a pressure of 2500 p.s.i. was employed in one run.

It was found that the above-described Type A and Type B conductive plastics could be pressed at 350° F. in simple compression molds at pressures of 250 lbs. to 7000 lbs. per square inch to produce plaques from 0.01" to 0.1" in thickness, having porosities ranging from 30% to 75%, and specific resistivities ranging from 0.005 to 1.0 ohm-cm.

It was found desirable to employ highly polished chrome plated mold surfaces in order to prevent sticking and subsequent damage to the plaque structure.

As would be expected, increasing molding pressures, with a given material, produced plaques of decreasing porosity, as shown in the following table:

| Molding pressure, lbs. sq. in. | Void volume, percent |
|---|---|
| 80 | 75 |
| 160 | 68 |
| 800 | 63 |
| 3,200 | 59 |

The porosity of such plaques as calculated from density values for materials used, and weight and dimension measurements on plaques, was confirmed by the values determined experimentally by vacuum impregnation techniques. This indicates that the porosity results from an interconnected type of void system leading to the outside and hence useable for battery purposes, rather than one having many blind or enclosed pockets which would be inaccessible to the electrolyte.

The specific resistance of porous plaques made with the Type A conductive plastic was found to be less than 0.01 ohm-cm. Those made with Type B conductive plastic has much greater resistance, namely, approximately 1 ohm-cm. specific resistance.

While the latter material has advantages in terms of weight reduction, lower cost, and greater porosity, its high resistance produced a higher IR drop which led to low terminal voltages and also to excessive heating during electrochemical forming and charging. It was found necessary, accordingly, to use a lightweight nickel grid to improve the conductivity. Woven nickel mesh was employed in an internal sandwich construction between two layers of conductive porous plastic. Easier handling and somewhat improved strength was obtained with rigid mesh than with a flexible mesh material. "Lektromesh" nickel grid (C. O. Jelliff Co.) of 24 mesh size was found to be a preferred material.

It was also found that improved adherence could be obtained by sandblasting the grid, followed by annealing and acid pickling. Without these steps the grid separated easily from the conductive plastic layers. The grid was incorporated in two ways:

(1) (a) By placing half of the required weight of molding powder into the mold and levelling;
(b) Inserting grid;
(c) Adding the balance of the molding powder charge;
(d) Closing mold and applying heat and pressure; and
(2) By molding porous conductive plastic plaques of half thickness plus remolding with a wire mesh sandwiched between two of the half thickness plaques.

The resulting product is shown in FIGURE 1.

FIGURE 1 represents an electrode produced by the process of this invention. As shown, the electrode 10 comprises a wire mesh 12 which serves as electron collector, or source, and as a convenient means to connect the electrode to external circuits. About the screen 12 there is disposed a porous matrix 14, of electrically conductive material and a resin binder, impregnated with the chemically active material. The porous matrix 14, by virtue of its electrical conductivity, likewise serves as an electron collector or source.

The electrode 10 is connected to an external circuit by means of a nickel foil terminal tab 16 welded to the screen 12.

*Impregnation of Positive Electrodes*

It was not found possible to impregnate the porous plaques with nickel nitrate solution by conventional methods so as to obtain commercially adequate capacities. This is due to the fact that aqueous nickel nitrate solution does not wet the conductive plastics used.

With the Type A conductive plastic, the addition of 0.1% sodium lauryl sulfate to the aqueous nickel nitrate solution produced rapid wetting and good vacuum impregnation. Impregnation was carried out under a vacuum corresponding to 10 mm. of mercury.

With the Type B conductive plastic, good results were obtained with a saturated aqueous solution of nickel nitrate, containing 0.2% of ethyl alcohol. Impregnation under vacuum, as for the Type A material, produced solids take-up adequate to provide battery capacity in a 2" x 3" x 0.050" plaque of better than 0.5 ampere-hour. While a saturated solution is preferred, a solution of less concentration will be operative but will necessitate a greater number of impregnation cycles for the same loading. By way of comparison a control plaque subjected to the same number of cycles (four) of impregnation by the nickel nitrate stock solution, but with the wetting agent omitted, provided a capacity of but 0.1 ampere-hour.

Following impregnation with the nickel nitrate the plaques were cathodically treated in 30% sodium hydroxide electrolytic bath to precipitate nickel hydroxide. In turn the electrode was connected as the anode in the bath and the nickel hydroxide anodically formed to the higher nickel oxide.

Positive plaques so made from Type A conductive plastic showed voltages of 1.4 volts vs. zinc and 1.2 volts vs. cadmium sheet electrodes and maintained these voltages for more than an hour at current densities of 0.06 ampere per square inch. Some of the plaques were subjected to six cycles of charge and discharge with ampere-hour efficiencies of better than 90%.

*Impregnation of Negative Electrodes*

One batch of electrodes were immersed in a 55% by weight aqueous solution of $Cd(NO_3)_2$ containing 0.1% by weight of the $Cd(NO_3)_2$ of ethyl alcohol. Impregnation was carried out under a vacuum equivalent to 10 mm. of mercury. After impregnation the electrode was cathodically formed in an electrolyte bath containing a 30% by weight of sodium hydroxide solution to convert the $Cd(NO_3)_2$ to $Cd(OH)_2$.

The impregnation and cathodic forming steps were repeated until a satisfactory deposit was formed.

As in the case of the nickel salt impregnation, it is preferred to employ a saturated solution of the cadmium impregnating salt.

A pair of the above described positive electrodes, and a negative electrode sandwiched between them, were positioned in a 25% aqueous solution of potassium hydroxide. The electrodes were spaced about ¼" apart. After 50 cycles of charge and discharge at a current density of 0.006 ampere/sq. inch the ampere-hour efficiency was found to exceed 85%.

Wetting agents, as a class, are well known to the art and any such material which will wet the particular plastic may be employed in carrying out the invention.

The terms percent porosity and percent void volume, as employed earlier, has reference to the ratio of the difference of the total volume and the volume of solids in the matrix to the total volume expressed in percent.

Having thus disclosed my invention in accordance with the statutes, what is claimed is:

1. The process of forming a conductive plastic battery electrode comprising the steps of: forming a porous matrix comprising electrically conductive particles and a synthetic resin binder; forming an aqueous solution of a water-soluble metal salt; adding, to said solution, a wetting agent in a quantity sufficient to wet said synthetic resin; impregnating said matrix with said aqueous solution; precipitating the hydroxide corresponding to said metal salt in said matrix; converting said hydroxide to an electrochemically active form.

2. The process of claim 1, wherein the metal salt is nickel nitrate.

3. The process of claim 1, wherein the metal salt is cadmium nitrate.

4. The process of making a conductive plastic electrode comprising the steps of combining electrically conductive particles and synthetic resin to form an electrically conductive plastic powder; molding said powder to form a sheet having a porosity in the range of about 30%–75% of voids; impregnating said resulting porous sheet with a nickel nitrate solution containing a minor proportion of a wetting agent suitable for wetting the synthetic resin; cathodically converting said nickel nitrate to nickel hydroxide; repeatedly impregnating and cathodically precipitating said nickel nitrate, and thereafter anodically forming the resulting electrode to convert the nickel hydroxide to a state of higher oxidation.

5. The process of claim 4, wherein said wetting agent is the sulfated fatty alcohol type.

6. The process of claim 4, wherein the wetting agent is ethyl alcohol.

7. An impregnating solution for impregnating a porous conductive plastic matrix comprising an aqueous solution of a metal salt and a minor proportion of a wetting agent sufficient to render said matrix absorbent to said solution.

8. The process of making a conductive plastic electrode comprising the steps of combining electrically conductive particles and synthetic resin to form an electrically conductive plastic powder; molding said powder to form a sheet having a porosity in the range of about 30%–75% of voids; impregnating said resulting porous sheet with a cadmium nitrate solution containing a minor proportion of a wetting agent suitable for wetting the synthetic resin; and cathodically converting said cadmium nitrate to cadmium hydroxide.

9. The process of claim 8, wherein said wetting agent is the sulfated fatty alcohol type.

10. The process of claim 8, wherein the wetting agent is ethyl alcohol.

References Cited in the file of this patent

UNITED STATES PATENTS

| | | |
|---|---|---|
| 2,519,399 | Roberts | Aug. 22, 1950 |
| 2,627,531 | Vogt | Feb. 3, 1953 |
| 2,772,321 | Ensign | Nov. 27, 1956 |

FOREIGN PATENTS

| | | |
|---|---|---|
| 331,540 | Great Britain | July 4, 1930 |